(12) United States Patent
Pinard

(10) Patent No.: US 7,072,450 B1
(45) Date of Patent: Jul. 4, 2006

(54) 3D VIEW OF INCOMING COMMUNICATIONS

(75) Inventor: Deborah L. Pinard, Kanata (CA)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 09/311,188

(22) Filed: May 13, 1999

(30) Foreign Application Priority Data

May 14, 1998 (GB) ................................. 9810422.7

(51) Int. Cl.
*H04M 1/64* (2006.01)
(52) U.S. Cl. ................... 379/88.11; 345/419; 715/836
(58) Field of Classification Search ............ 379/88.11, 379/88.13, 88.17, 88.18, 88.22, 93.17, 93.23; 345/418, 419, 420, 428, 433, 440.2, 976, 345/653, 664; 715/782
See application file for complete search history.

(56) References Cited

U.S. PATENT DOCUMENTS

| | | | | |
|---|---|---|---|---|
| 4,800,510 A | * | 1/1989 | Vinberg et al. ............. | 148/285 |
| 5,533,110 A | | 7/1996 | Pinard et al. | |
| 5,568,540 A | * | 10/1996 | Greco et al. ............. | 379/88.11 |
| 5,623,540 A | * | 4/1997 | Morrison et al. ....... | 379/112.01 |
| 5,631,954 A | | 5/1997 | Evans et al. | |
| 5,638,494 A | | 6/1997 | Pinard et al. | |
| 5,675,507 A | * | 10/1997 | Bobo, II .................. | 348/14.12 |
| 5,943,055 A | * | 8/1999 | Sylvan ....................... | 345/839 |
| 6,115,693 A | * | 9/2000 | McDonough et al. ......... | 705/10 |
| 6,233,318 B1 | * | 5/2001 | Picard et al. ............. | 379/88.12 |
| 6,411,685 B1 | * | 6/2002 | O'Neal ..................... | 379/88.14 |
| 6,466,663 B1 | * | 10/2002 | Ravenscroft et al. .. | 379/265.01 |

FOREIGN PATENT DOCUMENTS

| | | |
|---|---|---|
| EP | 0 227 327 | 11/1986 |
| GB | 2 276 520 A | 9/1994 |
| GB | 2 295 747 A | 11/1995 |
| WO | WO 97/08879 | 8/1996 |

OTHER PUBLICATIONS

Visible Decision's Discovery for Developers (IDS).*
Visible Decision's Discovery for Developers, Jun. 1996, Visual Decisions Inc.*
Robert Cowart, Mastering Windows 95, 1995, SYBEX.*
'Discovery for Developers', See 'Web pages'at URLs:.
http://www.vdi.com/products/d4d/d4d.htm.
http://www.vd.com/products/d4d/d4dwhite.htm.
http://www.vdi.com/products/d4d/application.htm.
http://www.vdi.com/products/d4d/INDUSTRY/DowJones.htm.
All 'Web Pages', Copyright 1997.

* cited by examiner

*Primary Examiner*—Fan Tsang
*Assistant Examiner*—Simon Sing
(74) *Attorney, Agent, or Firm*—Fenwick & West LLP

(57) ABSTRACT

A communications system comprising includes a network and a plurality of applications connected to the network. Each of the applications handles a different type of communication and stores information concerning incoming communications directed to users of the communications system. At least one computer is connected to the network and receives incoming communications information from selected applications. The at least one computer includes a display and a processor executing a view application. The view application processes the incoming communications information and generates a three-dimensional representation thereof for presentation on the display.

16 Claims, 3 Drawing Sheets

3D VIEW OF INCOMING COMMUNICATIONS

FIELD OF THE INVENTION

The present invention relates to communication systems and in particular to a communications system wherein information concerning different types of incoming communications directed to a user of the communications system can be amalgamated and presented to the user in a three-dimensional view.

BACKGROUND OF THE INVENTION

Communications systems to handle different types of communications such as for example, telephone calls, e-mail messages, voice-mail messages, facsimile messages and Internet messages are known. These communications system include a number of separate applications, each of which is responsible for handling one type of communication. Most applications provide status information to each user of the communications system to allow each user to determine the number of outstanding incoming communications that have been received. For example, e-mail applications inform each user of the number of unread messages in the user's in-box. Voice-mail applications usually inform a caller of the number of new and saved messages in the caller's in-box. Similar situations exist with other applications. Therefore, in order for a user, who has access to multiple applications, to determine the overall status of their incoming communications, the user must access each application separately. This is an onerous and time consuming task.

It is therefore an object of the present invention to provide a novel communications system wherein information concerning different types of incoming communications directed to a user of the communications system can be amalgamated and presented to the user in a three-dimensional view.

SUMMARY OF THE INVENTION

According to one aspect of the present invention there is a communications system comprising:

a network;

a plurality of applications connected to said network, each of said applications handling a different type of communication and storing information concerning incoming communications directed to users of said communications system; and at least one computer connected to said network and receiving said incoming communications information from selected applications, said at least one computer including a display and a processor executing a view application, said view application processing said incoming communications information and generating a three-dimensional representation thereof for presentation on said display.

Preferably, the three-dimensional representation includes a plurality of objects, with each object depicting a different type of incoming communication. At least some of the different types of incoming communications are represented by a plurality of objects, with each representing a category of incoming communication within the different types. The sizes of the objects represent the numbers of incoming communications. In a preferred embodiment, the three-dimensional representation is in the form of a graph including first, second and third orthogonal axes. The first axis denotes the type of incoming communication, the second axis denotes the number of incoming communications and the third axis denotes categories of incoming communications within the different types. Objects depicting the different types and categories of incoming communications are placed on the graph at spaced locations.

Preferably, the different types of incoming communications include two or more of e-mail messages, voice-mail messages, facsimile messages, telephone calls and Internet messages. In this case, e-mail messages are categorized along the third axis based on priority, voice-mail messages and telephone calls are categorized along the third axis based on whether the voice-mail messages and telephone calls originated from internal or external callers and Internet messages are categorized along the third axis based on subject matter. It is also preferred that the view application is linked to at least one of an e-mail, facsimile and Internet application on the at least one computer. Objects representing types of incoming communications corresponding to the at least one of the e-mail, facsimile and Internet application are selectable to invoke the at least one application.

According to another aspect of the present invention there is provided in a communications system including a network; a plurality of applications connected to said network, each of said applications handling a different type of communication and storing information concerning incoming communications directed to users of said communications system; and a plurality of computers connected to said network and receiving said incoming communications information from selected applications, each of said computers including a display and a processor, the improvement comprising:

a view application executed by each of said computers and requesting status information from selected applications concerning incoming communications handled thereby that are directed to a user of said communications system, said view application processing status information received from said selected applications and generating a three-dimensional representation thereof for presentation on said display.

According to still yet another aspect of the present invention there is provided in a communications system including separate applications to handle different types of communications and to receive incoming communications directed to users of said communication system, said applications being interconnected by a network, a method of presenting status information concerning incoming communications handled by separate applications that are directed to a specific user comprising the steps of:

sending a request over said network to selected applications for status information relating to incoming communications directed to said specific user;

processing status information received from said selected applications to generate a three-dimensional representation of said status information, status information received from each application being separately depicted in said three-dimensional representation; and presenting said three-dimensional representation on a display.

The present invention provides advantages in that when the view application is invoked a user can see at a glance how many incoming communications of different types the user has and can enter the appropriate application to access the incoming communications with the click of a mouse. The status of the user's incoming communications for all types of communications is therefore readily available.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENT

Figure 1:
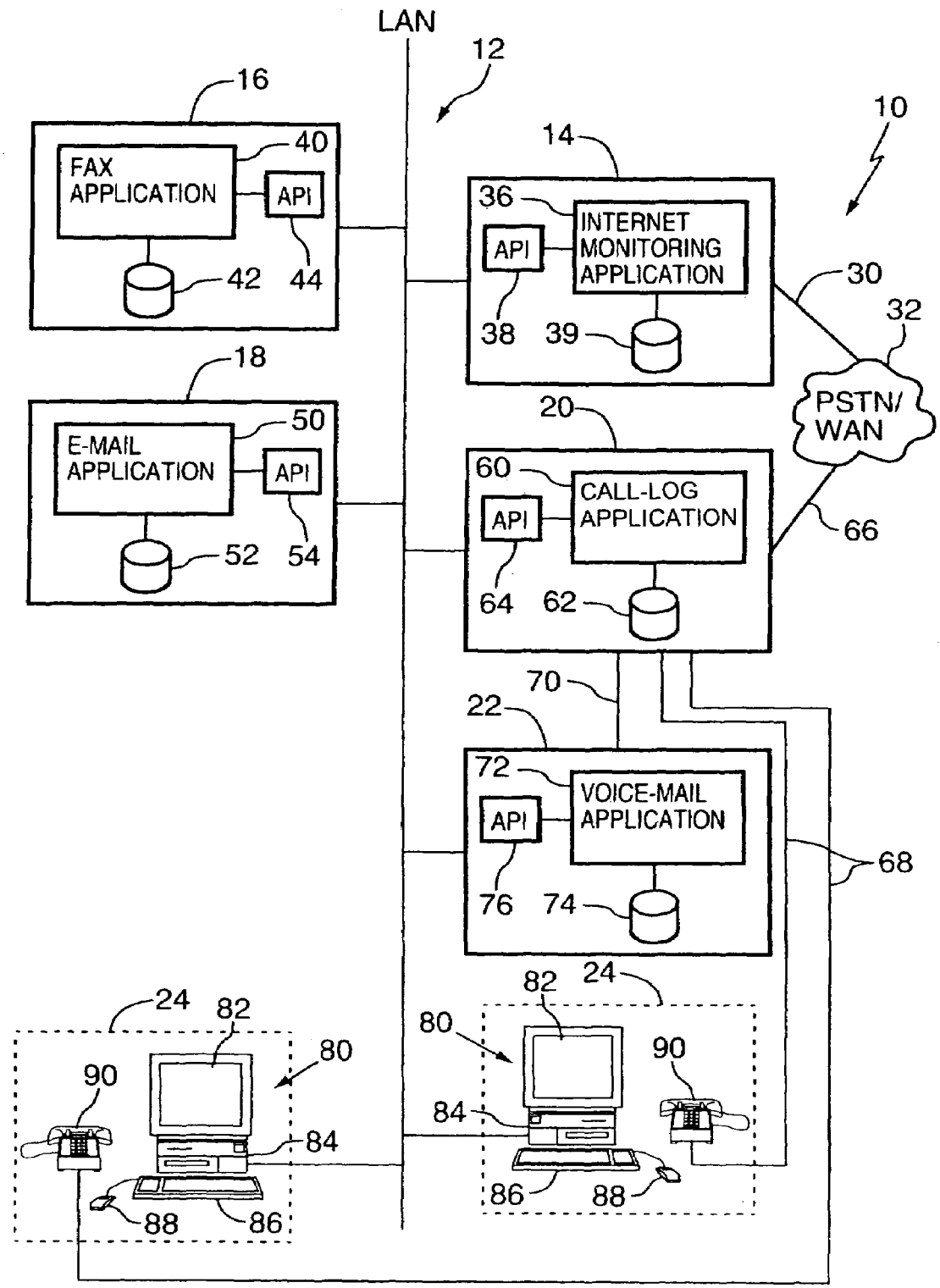
FIG. 1 is a schematic block diagram of a communications system in accordance with the present invention.

Referring now to FIG. 1, a communications system is shown and is generally indicated to by reference numeral 10. The communications system 10 includes a number of applications to handle different types of communications. Information concerning the different types of incoming communications directed to each user can be amalgamated and presented to the user in a three-dimensional view. Thus, an overall image of the status of each user's incoming communications is made available.

Communications system 10 includes a local area network (LAN) 12, a plurality servers 14 to 22 and a plurality of desktops 24. Server 14 is connected to the LAN 12 and to a trunk 30 extending to a public switched telephone network (PSTN)/wide area network (WAN) 32. The server 14 runs an Internet monitoring application 36 such as Yahoo or PointCast and captures Internet messages received from the PSTN/WAN 32 that are directed to the desktops 24. An applications program interface (API) 38 is also provided on the server 14 to allow the desktops 24 to be hooked to the Internet monitoring application 36. The Internet monitoring application 36 can be invoked to monitor newsgroups relating to different subjects and collect Internet messages directed to subject matter of interest. The incoming Internet messages are stored in a database 39.

Server 16 is connected to the LAN 12 and runs a facsimile application 40 which includes a database 42 storing incoming facsimile messages directed to the users of the communications system 10. An API 44 is also provided on the server 16 to allow the desktops 24 to be hooked to the facsimile application 40. Server 18 is connected to the LAN 12 and runs an e-mail application 50 which includes a database 52 storing e-mail messages directed to the users of the communications system 10. An API 54 is provided on the server 18 to allow the desktops 24 to be hooked to the e-mail application 50.

Server 20 is responsible for handling telephone communications and includes a call log application 60 including a database 62 which maintains a log of all incoming voice calls. An API 64 is provided on the server 20 to allow the desktops 24 to be hooked to the call log application 60. The server 20 is connected to the LAN 12, to trunks 66 leading to the PSTN/WAN 32 and to each of the desktops 24 via individual lines 69. Further details of the server 20 can be found in U.S. Pat. No. 5,657,446 to Pinard et al. issued on Aug. 12, 1997 and assigned to Mitel Corporation, assignee of the present invention, the content of which is incorporated herein by reference.

Server 22 is connected to the LAN 12 and to the communications server 20 via a line or a trunk 70. The server 22 runs a voice-mail application 72 which includes a database 74 storing voice-mail messages directed to the users of the communications system 10. An API 76 is provided on the server 22 to allow the desktops 24 to be hooked to the voice-mail application 72.

Each of the desktops 24 includes a personal computer 80 having a monitor or display 82, a processor 84 and input devices such as a keyboard 86 and pointing device or mouse 88 as well as a telephone 90. The telephone 90 of each desktop 24 is connected to the communications server 20 via one of the lines 68. The communications server 20 handles the incoming trunks 66 and the telephones 90 to allow telephone calls to be made to other desktops 24 as well as and to external parties over the PSTN/WAN 32. The communications sever 20 also allows telephone calls to be made to the voice-mail server 22 so that voice-mail messages may be retrieved. The personal computer 80 of each desktop 24 is connected to the LAN 12 and is hooked to the communications applications 36, 40, 50, 60 and 72 run by the servers 14 to 22 through the APIs 38, 44, 54, 64 and 76 respectively.

Each personal computer 80 operates in a Windows environment and runs a desktop application including facsimile, e-mail and Internet applications which can be invoked to enter the respective application and establish a "live" connection with the server responsible for that application. In this manner, facsimile, e-mail and Internet messages can be sent from and/or received by each personal computer 80.

The desktop application also includes a view application which can be invoked to gather and amalgamate incoming communications information from the communications applications 36, 40, 50, 60 and 72 through the respective APIs and generate a three-dimensional representation of the incoming communications information. The view application includes a defined interface which uses remote procedure calls to the communications applications to establish a connection to the communications applications. The view application is also linked to the facsimile, e-mail and Internet applications allowing a user to invoke the facsimile, e-mail and Internet applications through the view application as will be described.

In the present embodiment, the view application is created using a DISCOVERY toolkit developed by Visible Decisions of Toronto, Ontario. DISCOVERY provides an object-oriented framework which allows developers to create and modify landscapes so that information can be presented in a desired manner. The framework is composed of an ANNA programming language. This language is an object-oriented language similar in syntax to C++ and allows DISCOVERY applications to be developed. DISCOVERY applications allow static and real-time information to be integrated, modeled, alerted, filtered and brushed using the landscapes thereby to create three-dimensional representations of the information reflecting events and changes in the information. A user-definable communication protocol allows custom data servers to be built which deliver data to DISCOVERY as ANNA objects.

When the view application is invoked, the interface of the view application uses remote procedure calls to the communications applications through their respective APIs to establish a connection to the communications applications and request incoming communications status information. The requested incoming communications information typically includes a request for the number of incoming communications in the associated database, the number of read and unread incoming communications, the number of incoming communications in each category, etc. The communications applications respond by supplying the requested information.

When the incoming communications information is received by the view application, the view application processes the information according to its user-defined landscape. The landscape can be configured to select the type of incoming communications information to be presented (i.e. selecting the communications applications to which remote procedure calls are made), the categories of the incoming communications information to be presented as well as the colors, sizes and shapes of the objects used to represent the incoming communications information. The landscape in turn creates a three-dimensional image in the form of a graph modeling the incoming communications information. At this point, the view application opens a window in which the three-dimensional graph is located for display on the monitor 82 of the personal computer 80.

In the present embodiment, the graph includes x, y and z axes and uses objects to depict the incoming communications information. The x-axis denotes the types of incoming communications being presented. The z-axis denotes the categories for each type of incoming communication. The y-axis denotes the number of incoming communications of each category. As mentioned previously, the view application is linked to the e-mail, facsimile and Internet applications. A user can selectively invoke the e-mail, facsimile or Internet application by placing the cursor on the monitor 82 on an object displayed on the graph or on a button beneath the x-axis that is associated with the type of incoming communication to be selected using one of the input devices and then selecting that type of incoming communication by double-clicking the mouse 88. When this occurs, the selected application is invoked and a connection between the desktop application and the communications application responsible for handling the selected type of incoming communication is established. Incoming communications stored in the associated database of the selected type of incoming communications can then be accessed and read.

Figure 2A:
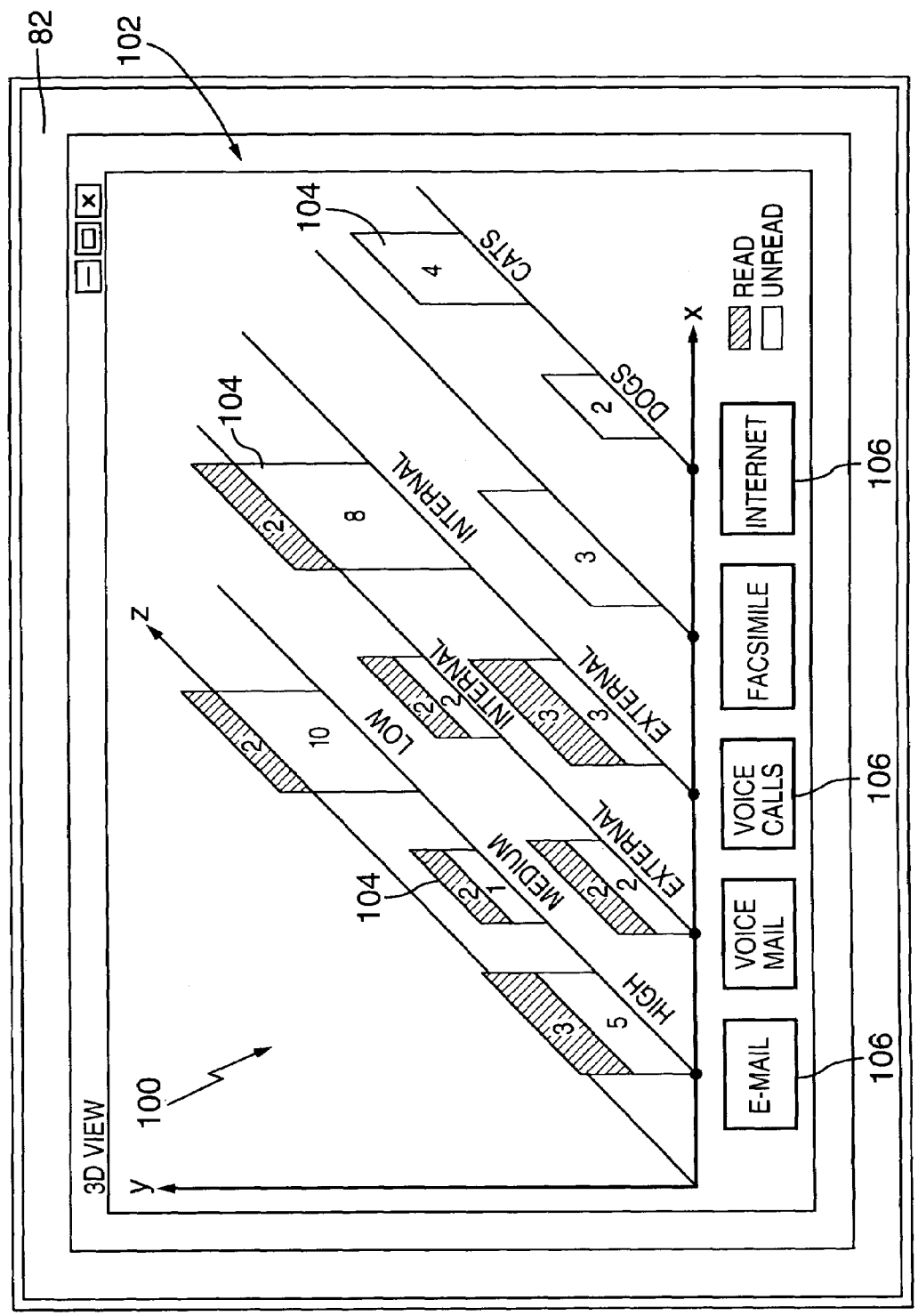
FIG. 2a is an enlarged view a computer monitor displaying a window in which a three-dimensional representation of incoming communications information directed to a user of the communications system of FIG. 1 is presented.

The window includes minimize, reduce and close icons at its top right-hand corner (see FIG. 2a). As is well known, when the close icon is selected, the view application is exited. Toggling between the reduce icon changes the size of the window back and forth between full screen and partial screen sizes. When the minimize icon is selected, the view application presents an icon which includes a performance monitor-type graph (see FIG. 2b) depicting the total number of outstanding incoming communications (i.e. incoming communications that have not been previously accessed).

FIG. 2a shows an example of a three-dimensional graph 100 generated by the view application and presented in a window 102 displayed on the monitor 82. In this case, the view application is configured to gather and amalgamate incoming communications information from each of the communications applications 36, 40, 50, 60 and 72 through their respective APIs for display. As can be seen, rectangles 104 depicting e-mail messages appear on the x-axis first. The e-mail messages are separated into high priority, medium priority and low priority categories along the z-axis and a rectangle is provided for each category. The e-mail messages of each category are further separated into read and unread categories along the y-axis. The height of each rectangle along the y-axis reflects the number of e-mails in each category. For ease of reference, numerical values representing the number of e-mails in each category are displayed within the rectangles.

Rectangles depicting voice-mail messages appear next on the x-axis and are separated into external and internal categories along the z-axis. The voice-mail messages of each category are further separated into saved and new categories along the y-axis.

Incoming telephone calls appear next on the x-axis and are separated into external and internal categories along the z-axis. The incoming telephone calls of each category are separated into answered and unanswered categories along the y-axis.

Facsimile messages appear next on the x-axis and are all saved in one category with the height of the rectangle reflecting the number of facsimiles received. Internet messages appear last on the x-axis and are separated into subject matter categories along the z-axis.

Buttons 106 are provided beneath the x-axis and can be selected to access the associated type of incoming communication.

Figure 2B:
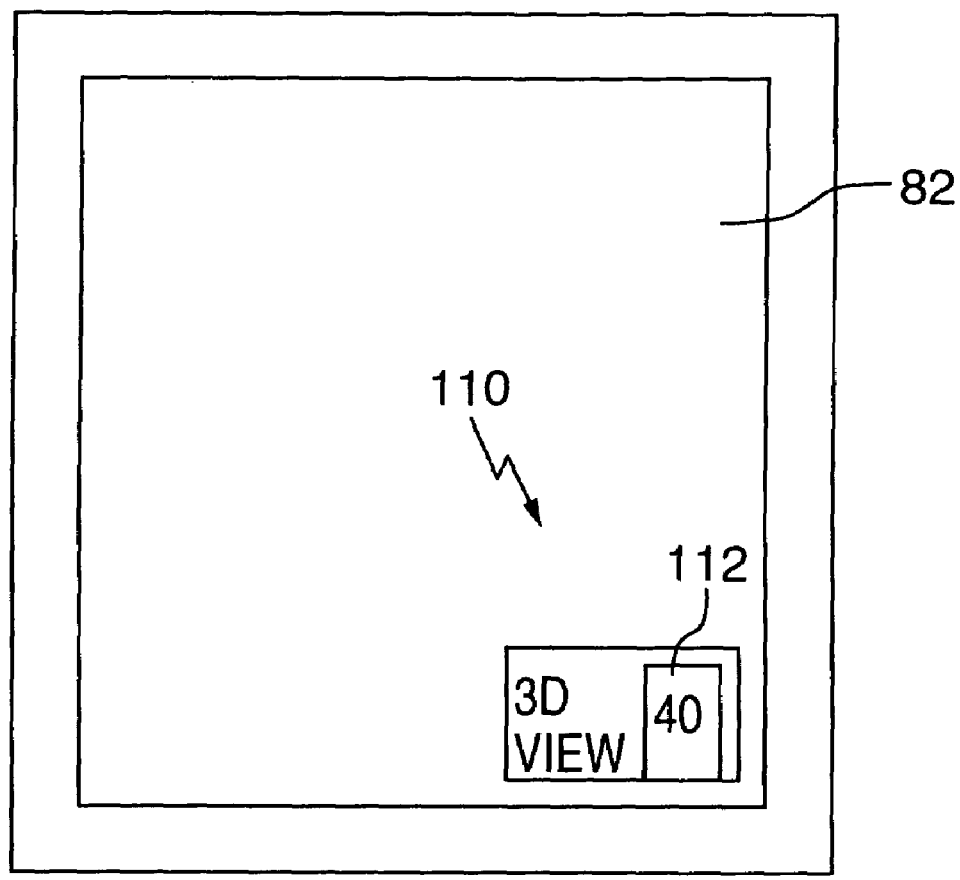
FIG. 2b is a view of the computer monitor of FIG. 2a depicting an icon representing the window when the window is minimized.

FIG. 2b shows the icon 110 corresponding to the window 102 when the window is minimized. As can be seen, the icon 110 includes a two-dimensional performance monitor 112 indicating the total number of outstanding incoming communications of the user.

As will be appreciated, the view applications software allows a user to see at a glance how many incoming communications of different types the user has and of those incoming communications which ones are outstanding. The user can access the incoming communications with the click of a mouse by selecting objects or buttons associated with incoming communications to be accessed.

Although the telephones 90 have been shown as being stand alone and connected to the communications server 20 via the lines 68, it should be appreciated that the telephones may be connected to the personal computers 80 via universal serial busses (USBs). In this case, the telephones access the communications server 20 over the LAN 12 through the personal computers 80. Voice-mail messages are accessed over the LAN 12 by selecting a voice-mail application included in the desktop application.

It should also be appreciated that the communications system 10 can also be based on the agent architecture described in U.S. Pat. No. 5,638,494 to Pinard et al issued on Jun. 10, 1997, assigned to Mitel Corporation, assignee of the present invention. In this case, the desktop applications are controlled by desktop agents which communicate with user interface agents responsible for the view application, e-mail application, facsimile application, Internet application and possibly voice-mail application, if the telephones are connected to the personal computers via USBs.

Although a preferred embodiment of the present invention has been described, those of skill in the art will appreciate that variations and modifications may be made without departing from the spirit and scope thereof as defined by the appended claims.

I claim:

1. A communications system comprising:
   a network;
   a plurality of applications connected to said network, each of said applications handling a different type of communication and storing information concerning incoming communications directed to users of said communications system; and
   at least one computer connected to said network and receiving said incoming communications information from selected applications, said at least one computer including a display and a processor executing a view application, said view application processing said incoming communications information and generating a three-dimensional representation thereof for presentation on said display, wherein said three-dimensional representation is a graphical representation including first, second and third generally orthogonal axes, said first axis denoting different types of incoming communications, said second axis denoting numbers of incoming communications and said third axis denoting categories of incoming communications within said different types, objects representing different types and categories of incoming communications appearing on said graphical representation, wherein at least one of said incoming communications is categorized along said third axis based on whether the at least one of the incoming communications originated internally or externally.

2. A communications system according to claim 1 wherein the sizes of said objects represent the numbers of incoming communications.

3. A communications system according to claim 2 wherein said objects appear on said graphical representation at spaced locations.

4. A communications system according to claim 3 wherein said view application is configurable by a user to determine said selected applications and categories of incoming communications within said different types.

5. A communications system according to claim 1 wherein said first axis is an x-axis, said second axis is a y-axis and said third axis is a z-axis, each object being in the form of a rectangle and including an associated numerical value indicating the number of incoming communications said object represents.

6. A communications system according to claim 5 wherein at least some of said objects are subdivided to categorize incoming communications into read and unread incoming communications.

7. In a communications system including a network; a plurality of applications connected to said network, each of said applications handling a different type of communication and storing information concerning incoming communications directed to users of said communications system; and a plurality of computers connected to said network and receiving said incoming communications information from selected applications, each of said computers including a display and a processor, the improvement comprising:

a view application executed by each of said computers and requesting status information from selected applications concerning incoming communications handled thereby that are directed to a user of said communications system, said view application processing status information received from said selected applications and generating a three-dimensional representation thereof for presentation on said display, wherein said three-dimensional representation is a graphical representation including first, second and third generally orthogonal axes, said first axis denoting different types of incoming communications, said second axis denoting numbers of incoming communications and said third axis denoting categories of incoming communications within said different types, objects representing different types and categories of incoming communications appearing on said graphical representation, wherein at least one of said incoming communications is categorized along said third axis based on whether the at least one of the incoming communications originated internally or externally.

8. In a communications system including separate applications to handle different types of communications and to receive incoming communications directed to users of said communication system, said applications being interconnected by a network, a method of presenting status information concerning incoming communications handled by separate applications that are directed to a specific user comprising the steps of:

sending a request over said network to selected applications for status information relating to incoming communications directed to said specific user; processing status information received from said selected applications to generate a three-dimensional graphical representation of said status information including three generally orthogonal axes, a first axis denoting different types of incoming communications, a second axis denoting numbers of incoming communications and a third axis denoting categories of incoming communications within said different types, status information received from each application being separately depicted in said three-dimensional graphical representation as objects representing different types and categories of incoming communications; and presenting said three-dimensional graphical representation on a display, wherein at least one of said incoming communications is categorized along said third axis based on whether the at least one of the incoming communications originated internally or externally.

9. The method of claim 8 further comprising the step of adjusting the size of said objects to reflect the numbers of incoming communications.

10. The method of claim 9 further comprising the step of subdividing said objects to categorize incoming communications into read and unread incoming communications.

11. The method of claim 10 wherein the different types of incoming communications include two or more of e-mail messages, voice-mail messages, facsimile messages and Internet messages.

12. A communications system comprising:

a network;

a plurality of applications connected to said network, each of said applications handling a different type of communication and storing information concerning incoming communications directed to users of said communications system; and at least one computer connected to said network and receiving said incoming communications information from selected applications, said at least one computer including a display and a processor executing a view application, said view application processing said incoming communications information and generating a three-dimensional representation thereof for presentation on said display, wherein said three-dimensional representation is a graphical representation including first, second and third generally orthogonal axes, said first axis denoting different types of incoming communications, said different types of incoming communications including two or more of e-mail messages, voice-mail messages, facsimile messages, telephone calls and Internet messages, said second axis denoting numbers of incoming communications and said third axis denoting categories of incoming communications within said different types, objects representing different types and categories of incoming communications appearing on said graphical representation, wherein said e-mail messages are categorized along said third axis based on priority, wherein voice-mail and telephone calls are categorized along said third axis based on whether the voice-mails and telephone calls originated from internal or external callers and wherein Internet messages are categorized along said third axis based on subject matter.

13. A communications system according to claim 12 wherein said view application is linked to at least one of an e-mail, facsimile and Internet application on said at least one computer, objects representing different types of incoming communications corresponding to said at least one of the e-mail, facsimile and Internet application being selectable to invoke the at least one application.

14. A communications system according to claim 13 wherein each of said applications is run on a server connected to said network, each server also running an applications program interface to act between said application and said view application.

15. A communications system according to claim 14 wherein said view application uses remote procedure calls to establish connections to said applications through said applications program interfaces and gather said incoming communications information.

16. A communications system according to claim 13 wherein said view application presents said three-dimensional graphical representation in a window on said display, when said window is reduced, said view application presenting an icon representing said window on said display, said icon providing a visual indication of the total number of outstanding incoming communications of all types directed to said user.

\* \* \* \* \*